United States Patent
Etezadi et al.

(10) Patent No.: US 10,790,929 B2
(45) Date of Patent: Sep. 29, 2020

(54) NESTED LOOKUP TABLE FOR SYMBOL DETECTION WITH INITIAL CANDIDATE REDUCTION

(71) Applicant: Samsung Electronics Co., Ltd., Suwon-si, Gyeonggi-do (KR)

(72) Inventors: Farrokh Etezadi, San Diego, CA (US); Hyukjoon Kwon, San Diego, CA (US); Jooyeol Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/231,329

(22) Filed: Dec. 21, 2018

(65) Prior Publication Data
US 2020/0119835 A1    Apr. 16, 2020

Related U.S. Application Data

(60) Provisional application No. 62/745,165, filed on Oct. 12, 2018.

(51) Int. Cl.
*H04L 1/00* (2006.01)
*H04L 1/24* (2006.01)

(52) U.S. Cl.
CPC .......... *H04L 1/0016* (2013.01); *H04L 1/0052* (2013.01); *H04L 1/0054* (2013.01); *H04L 1/246* (2013.01)

(58) Field of Classification Search
CPC ..... H04L 1/0016; H04L 1/0054; H04L 1/246; H04L 1/0052
See application file for complete search history.

(56) References Cited

U.S. PATENT DOCUMENTS

| | | |
|---|---|---|
| 8,351,549 B1 | 1/2013 | Choi et al. |
| 8,411,778 B1 | 4/2013 | Lee et al. |
| 8,737,539 B2 | 5/2014 | Koshy |
| 8,953,727 B2 | 2/2015 | Germanovich et al. |
| 9,160,454 B2 | 10/2015 | Sun et al. |
| 9,319,182 B2 | 4/2016 | Wan et al. |
| 2013/0177114 A1* | 7/2013 | Germanovich ..... H04L 25/0321 375/346 |
| 2016/0315792 A1* | 10/2016 | Rahmati ............. H04B 7/0413 |
| 2017/0142726 A1* | 5/2017 | Kim .................. H04W 72/0453 |

* cited by examiner

*Primary Examiner* — Thai Nguyen
(74) *Attorney, Agent, or Firm* — Lewis Roca Rothgerber Christie LLP

(57) ABSTRACT

A system and method for receiving a quadrature amplitude modulation symbol. In some embodiments, the symbol has a plurality of bits and is associated with a point in a constellation of quadrature amplitude modulation points, each point of the constellation having associated with it a binary word. The method includes receiving a first analog signal carrying a modulation; performing initial estimation, to generate a first initial modulation estimate, for a portion of the first analog signal carrying a modulation; identifying, based on the first initial modulation estimate, a row of an initial candidate lookup table, the row corresponding to a region of the constellation; and reading from the row of the initial candidate lookup table a first plurality of initial candidate points of the constellation.

20 Claims, 9 Drawing Sheets

| K | M | L |
|---|---|---|
| 16 | 1 | 1, 4 |
| 32 | 1, 2 | 1, 4, 16 |
|  | 3 | 1, 4 |
| 64 | 1, ..., 8 | 1, 4, 16 |
| 128 | 1, ..., 16 | 1, 4, 16, 64 |
|  | 17, 18, 19 | 1, 4, 16 |

*FIG. 5*

NESTED LOOKUP TABLE FOR SYMBOL DETECTION WITH INITIAL CANDIDATE REDUCTION

CROSS-REFERENCE TO RELATED APPLICATION(S)

The present application claims priority to and the benefit of U.S. Provisional Application No. 62/745,165, filed Oct. 12, 2018, entitled "NESTED LUT DESIGN FOR FLEXIBLE INITIAL CANDIDATE REDUCTION IN LOW COMPLEXITY SYMBOL DETECTION", the entire content of which is incorporated herein by reference.

FIELD

One or more aspects of embodiments according to the present disclosure relate to receiving data, and more particularly to a system and method for selecting a set of initial candidate points in a quadrature amplitude modulation receiver.

BACKGROUND

The calculation of log-likelihood ratios for maximum likelihood estimation may be computationally costly, especially for large quadrature amplitude modulation constellations.

Thus, there is a need for an efficient system and method for calculating log-likelihood ratios, or approximate log-likelihood ratios.

SUMMARY

According to an embodiment of the present disclosure, there is provided a method for receiving a quadrature amplitude modulation symbol, the symbol being associated with a point in a constellation of quadrature amplitude modulation points, each point of the constellation having associated with it a binary word, the method including: receiving a first analog signal carrying a modulation; performing initial estimation, to generate a first initial modulation estimate, for a portion of the first analog signal, the first initial modulation estimate having an in-phase component, and a quadrature component; identifying, based on the first initial modulation estimate, a row of an initial candidate lookup table, the row corresponding to a region of the constellation; and reading from the row of the initial candidate lookup table a first plurality of initial candidate points of the constellation, each of the initial candidate points being a point in the constellation, one of the initial candidate points being more distant, from a center of the region, than a point, in the constellation, not among the initial candidate points. In some embodiments, at each bit position of the quadrature amplitude modulation symbol: the binary word of one of the initial candidate words has a one, and the binary word of one of the initial candidate words has a zero.

In some embodiments, at each bit position of the quadrature amplitude modulation symbol: the binary word of each of two of the initial candidate words has a one, and the binary word of each of two of the initial candidate words has a zero.

In some embodiments, the method further includes: receiving a second analog signal carrying a modulation; performing initial estimation, to generate a second initial modulation estimate, for a portion of the second analog signal, the second initial modulation estimate having an in-phase component, and a quadrature component; identifying, based on the second initial modulation estimate, the row of the initial candidate lookup table; and reading from the row of the initial candidate lookup table a second plurality of initial candidate points of the constellation, the second plurality of initial candidate points including the first plurality of initial candidate points, each of the second plurality of initial candidate points being a point in the constellation.

In some embodiments, the initial candidate points of the first plurality of initial candidate points are: contiguous within the row of the of the initial candidate lookup table, and at one end of the row of the of the initial candidate lookup table.

In some embodiments, at each bit position of the quadrature amplitude modulation symbol: the binary word of one of the second plurality of initial candidate words has a one, and the binary word of one of the second plurality of initial candidate words has a zero.

In some embodiments, at each bit position of the quadrature amplitude modulation symbol: the binary word of each of two of the second plurality of initial candidate words has a one, and the binary word of each of two of the second plurality of initial candidate words has a zero.

In some embodiments, the method further includes: determining that the first initial modulation estimate is not in the first quadrant; and in response to determining that the initial modulation estimate is not in the first quadrant: transforming the initial modulation estimate into the first quadrant using a first transformation; and after generating the first plurality of initial candidate points, transforming the initial candidate points with a transformation corresponding to an inverse of the first transformation.

In some embodiments, the transformation corresponding to the inverse of the first transformation includes reversing one or the other or both of the two most significant bits of the binary word corresponding to a constellation point.

In some embodiments, the method further includes calculating a log likelihood ratio for a bit of the quadrature amplitude modulation symbol over the initial candidate points. In some embodiments, the method further includes calculating the log likelihood ratio as a difference between: a first sum of probabilities, over the initial candidate points, and a second sum of probabilities, over the initial candidate points.

According to an embodiment of the present disclosure, there is provided a system for receiving a quadrature amplitude modulation symbol, the symbol being associated with a point in a constellation of quadrature amplitude modulation points, each point of the constellation having associated with it a binary word, the system including: an analog front end, an analog to digital converter, and a processing circuit, the processing circuit being configured to: receive a first analog signal carrying a modulation; perform initial estimation, to generate a first initial modulation estimate, for a portion of the first analog signal, the first initial modulation estimate having an in-phase component, and a quadrature component; identify, based on the first initial modulation estimate, a row of an initial candidate lookup table, the row corresponding to a region of the constellation; and read from the row of the initial candidate lookup table a first plurality of initial candidate points of the constellation, each of the initial candidate points being a point in the constellation, one of the initial candidate points being more distant, from a center of the region, than a point, in the constellation, not among the initial candidate points. In some embodiments, at each bit position of the quadrature amplitude modulation symbol: the binary word of one of the initial candidate words has a one, and the binary word of one of the initial candidate words has a zero.

In some embodiments, at each bit position of the quadrature amplitude modulation symbol: the binary word of each of two of the initial candidate words has a one, and the binary word of each of two of the initial candidate words has a zero.

In some embodiments, the processing circuit is further configured to: receive a second analog signal carrying a modulation; perform initial estimation, to generate a second initial modulation estimate, for a portion of the second analog signal, the second initial modulation estimate having an in-phase component, and a quadrature component; identify, based on the second initial modulation estimate, the row of the initial candidate lookup table; and read from the row of the initial candidate lookup table a second plurality of initial candidate points of the constellation, the second plurality of initial candidate points including the first plurality of initial candidate points, each of the second plurality of initial candidate points being a point in the constellation.

In some embodiments, the initial candidate points of the first plurality of initial candidate points are: contiguous within the row of the of the initial candidate lookup table, and at one end of the row of the of the initial candidate lookup table.

In some embodiments, at each bit position of the quadrature amplitude modulation symbol: the binary word of one of the second plurality of initial candidate words has a one, and the binary word of one of the second plurality of initial candidate words has a zero.

In some embodiments, at each bit position of the quadrature amplitude modulation symbol: the binary word of each of two of the second plurality of initial candidate words has a one, and the binary word of each of two of the second plurality of initial candidate words has a zero.

In some embodiments, the processing circuit is further configured to: determine that the first initial modulation estimate is not in the first quadrant; and in response to determining that the initial modulation estimate is not in the first quadrant: transform the initial modulation estimate into the first quadrant using a first transformation; and after generating the first plurality of initial candidate points, transform the initial candidate points with a transformation corresponding to an inverse of the first transformation.

According to an embodiment of the present disclosure, there is provided a system for receiving a quadrature amplitude modulation symbol, the symbol being associated with a point in a constellation of quadrature amplitude modulation points, each point of the constellation having associated with it a binary word, the system including: an analog front end, an analog to digital converter, and a means for processing, the means for processing being configured to: receive a first analog signal carrying a modulation; perform initial estimation, to generate a first initial modulation estimate, for a portion of the first analog signal, the first initial modulation estimate having an in-phase component, and a quadrature component; identify, based on the first initial modulation estimate, a row of an initial candidate lookup table, the row corresponding to a region of the constellation; and read from the row of the initial candidate lookup table a first plurality of initial candidate points of the constellation, each of the initial candidate points being a point in the constellation, one of the initial candidate points being more distant, from a center of the region, than a point, in the constellation, not among the initial candidate points.

BRIEF DESCRIPTION OF THE DRAWINGS

These and other features and advantages of the present disclosure will be appreciated and understood with reference to the specification, claims, and appended drawings wherein:

FIG. 5 is a parameter table, according to an embodiment of the present disclosure;

DETAILED DESCRIPTION

The detailed description set forth below in connection with the appended drawings is intended as a description of exemplary embodiments of a system and method for initial candidate reduction provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
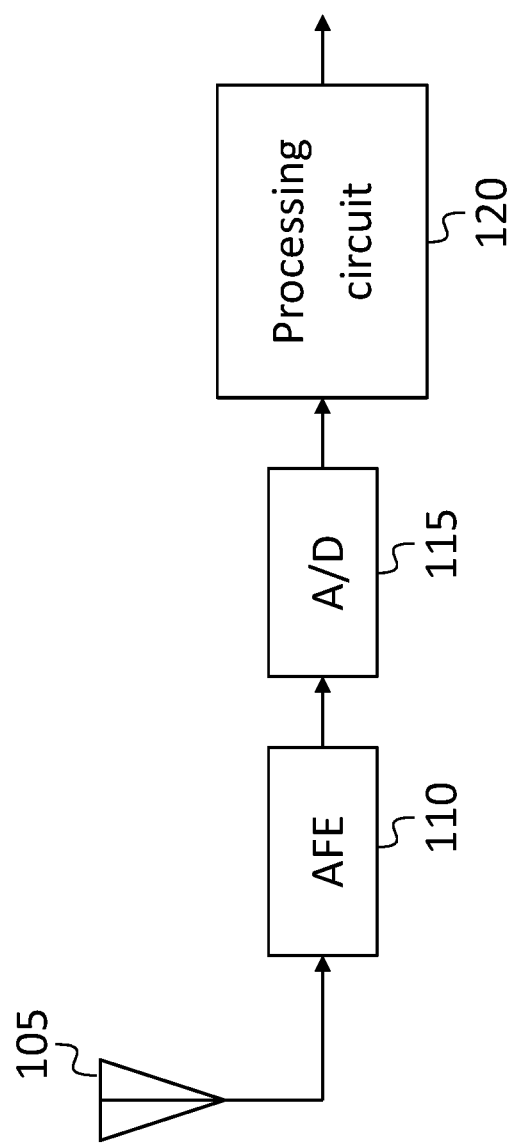
FIG. 1 is a block diagram of a receiver, according to an embodiment of the present disclosure.

In some embodiments, as shown in FIG. 1, a receiver may include a receiving antenna 105, an analog front end 110 (which may include a low-noise amplifier, and one or more mixers and additional amplifiers), an analog to digital converter 115, and a processing circuit 120 (discussed in further detail below). The receiver may receive a radio signal that carries quadrature amplitude modulation (QAM), e.g., 64 QAM, 256 QAM, or 1024 QAM. Some embodiments described herein use the example of 1024 QAM to illustrate certain concepts, but the present disclosure is not limited thereto and it may be applied to QAM modulation of any size. Each symbol of a QAM modulated data stream may correspond to (i.e., have in-phase and quadrature components corresponding coordinates of) a point in a corresponding constellation (e.g., one of the 1024 points of the 32×32 1024 QAM constellation). Each point in the constellation may be associated with a binary word, e.g., a 10-bit binary word in the case of 1024 QAM. The output of the processing circuit 120 may be a sequence of received symbols, each represented, for example (e.g., in the case of 1024 QAM), by a 10-bit binary word.

A symbol detector of the receiver (which may be implemented in the processing circuit 120) may be responsible for calculating the log-likelihood ratios (LLRs) of the coded bits in the received signal. Maximum likelihood (ML) detection may be used, and for this purpose, the LLR of each bit may be calculated over all of the constellation points as follows:

$$LLR_i = \log \frac{p(y \mid b_i = 0)}{p(y \mid b_i = 1)} = \log \sum_{\substack{x \in Q_{QAM} \\ b_i=0}} p(y \mid x) - \log \sum_{\substack{x \in Q_{QAM} \\ b_i=1}} p(y \mid x).$$

Such an approach may be computationally burdensome, especially for a large constellation such as 1024 QAM constellation.

Initial candidate reduction (ICR) may be used to select a subset of the constellation points, which may then be used to calculate approximate log-likelihood ratios at lower computational cost. The log-likelihood ratios may then be calculated as follows:

$$LLR_i \approx \log \sum_{\substack{x \in \tilde{Q}(\hat{x}(y)) \\ b_i=0}} p(y \mid x) - \log \sum_{\substack{x \in \tilde{Q}(\hat{x}(y)) \\ b_i=1}} p(y \mid x)$$

where $\hat{x}(y)$ is the initial estimate of the transmitted symbol from the received signal and $\tilde{Q}(\hat{x}(y)) \subset Q_{QAM}$ is the set of initial candidate points. The calculation of $p(y|x)$ may follow a standard method and rely on the assumption of additive white Gaussian noise (AWGN). In particular, it may reduce to $p(y|x) \sim -|y-hx|^2$, where h represent the channel.

The set of initial candidate points may be selected from the constellation so that for each bit position in the binary words associated with the constellation (e.g., for each of the 10 bit positions of the 10-bit binary words associated with a 1024 QAM constellation), at least M of the binary words of the initial candidate points has a binary one (at that bit position) (M being a positive integer) and at least M of the binary words of the initial candidate points has a binary zero (at that bit position). In some embodiments M is selected to be equal to one. This characteristic may be advantageous because the LLR of a particular bit may be calculated by comparing the probability of that bit being zero versus one; if one of the sets of points over which the sums are evaluated $$\left(\text{i.e., } \tilde{Q}(\hat{x}(y)) \atop b_i = 0 \text{ and } \tilde{Q}(\hat{x}(y)) \atop b_i = 1\right)$$

is empty, the corresponding sum may be zero, and the calculation may result in the evaluation of the logarithm of zero.

Figure 2:
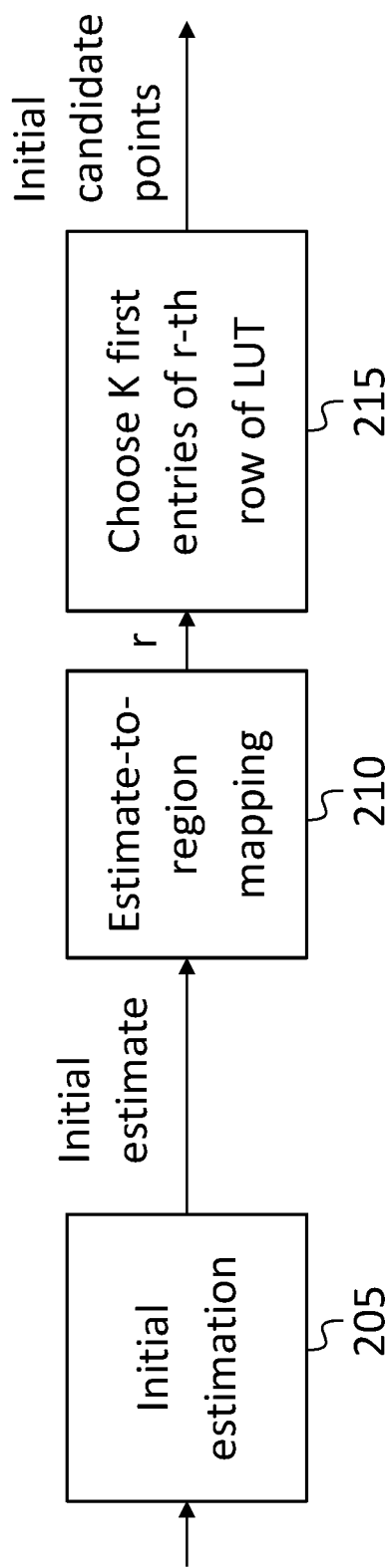
FIG. 2 is a flow chart of a method for selecting initial candidate points, according to an embodiment of the present disclosure.

In some embodiments, a method for selecting initial candidate points proceeds as illustrated in FIG. 2. Initial estimation is used to generate, at 205, an initial modulation estimate, which is a complex number, and which may be among the points of the constellation, although it need not be (as a result, for example, of noise or interference in the radio reception) precisely at a constellation point. The initial modulation estimate may, for example, be represented as two fixed point numbers, representing the real and imaginary parts of the initial modulation estimate. A region of the constellation may then be selected, at 210, based on the initial modulation estimate, by an estimate-to-region mapping method, and the initial candidate points may then be read, at 215, from a row of a lookup table, the row corresponding to the selected region. Such a region may, for example, be a square sub-region of the constellation, as illustrated for example in FIG. 4, and as discussed in further detail below. The method disclosed herein for selecting initial candidate points may make possible a less costly computation of approximate log-likelihood ratios, as mentioned above.

Figure 3:
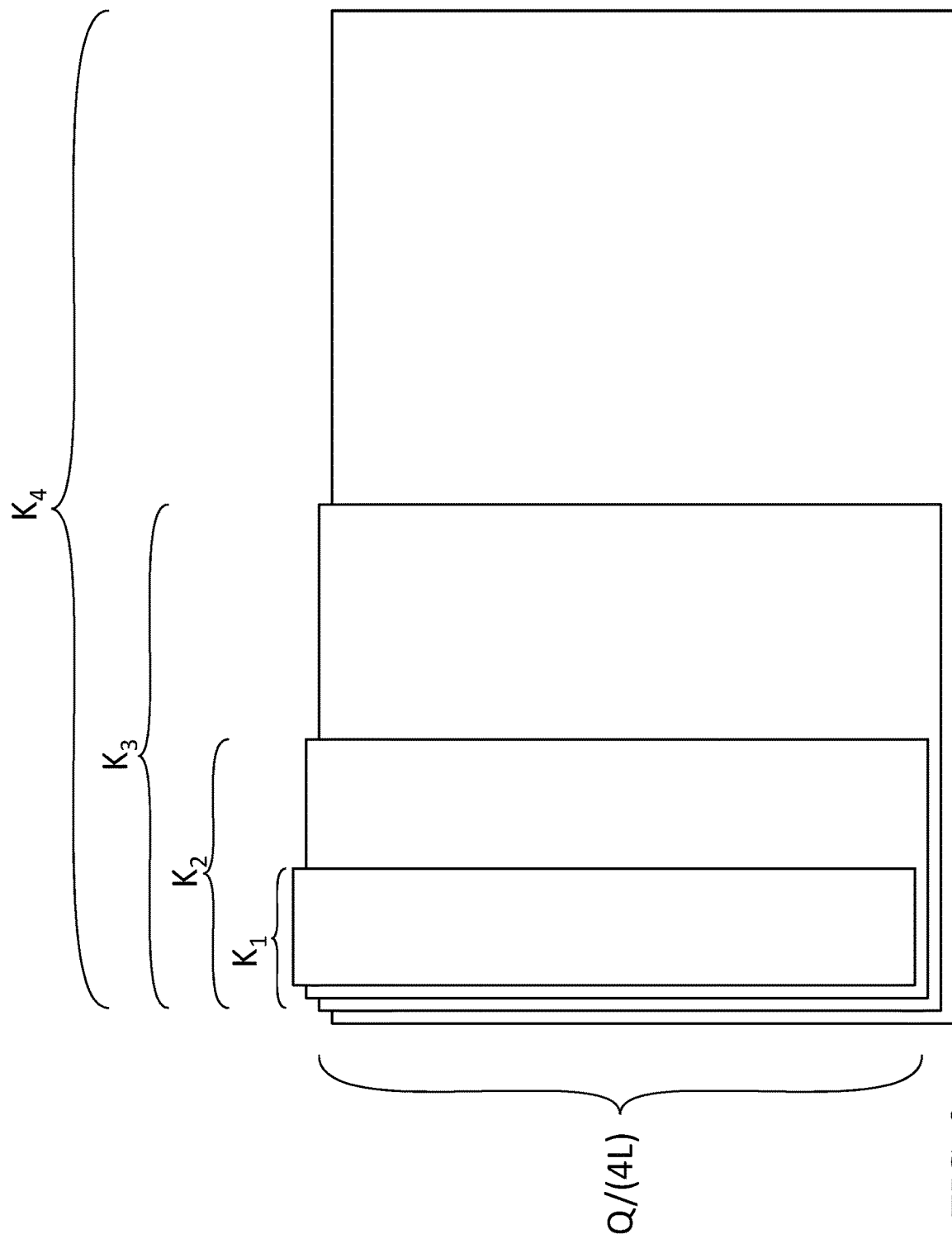
FIG. 3 is a schematic illustration of nested lookup tables, according to an embodiment of the present disclosure.

The lookup table may be nested, e.g., in the sense that each row may contain lists, of different sizes, of initial candidate points. For example, if a set of 16 initial candidate points is to be used, the first 16 elements of the row corresponding to the region may be read from the lookup table; if a set of 32 initial candidate points is to be used, the first 32 elements of the row corresponding to the region may be read from the lookup table. That it is possible to construct a lookup table having this characteristic may be arranged by using a method, for generating the sets of initial candidate points, which insures that each set includes within it the next smaller set. Such a method is described in further detail below. FIG. 3 illustrates the concept of a nested lookup table, with $K_1$ being the lookup table with the smallest number of points in each set of initial candidate points (e.g., containing 16 points in each row), $K_2$ being the next-larger set to $K_1$ (e.g., containing 16 points in each row), $K_3$ being the next-larger set to $K_2$ (e.g., containing 64 points in each row), and $K_4$ being the largest set (e.g., containing 128 points in each row). Each of the nested tables may include $Q/(4L)$ rows, where Q is the size of the constellation, and L is the number of points in each region, as discussed in further detail below.

The number of initial candidate points to be used in the log-likelihood ratio calculation may depend on the current link conditions, e.g., it may depend on the current signal-to-noise ratio, with a smaller set being used when the signal to noise ratio is relatively good, and a larger set being used when the signal to noise ratio is relatively poor.

The estimate-to-region mapping method may identify the region corresponding to the initial modulation estimate by evaluating the following expression, for example:

$$r = \operatorname{argmin}_{j \in \left\{1, 2, \ldots, \frac{Q}{4L}\right\}} |x_{init} - \tilde{x}_j|,$$

where $x_{init}$ is the initial modulation estimate and $\tilde{x}_j$ is the center point of the j-th region. Equivalently, the estimate-to-region mapping method may identify the region within which the initial modulation estimate falls.

Each row of each of the nested lookup tables may be generated using the following parameters:
  Q being the size of the constellation e.g., 1024 for 1024 QAM,
  K being the number of initial candidate points, i.e., the width of the lookup table,
  M being, for each bit position, the minimum number of initial candidate points for which the corresponding binary word has a binary one and the minimum number of initial candidate points for which the corresponding binary word has a binary zero, and
  L being the number of constellation points in each region.

The lookup table may be constructed for initial modulation estimates that are in one quadrant (e.g., the first quadrant) of the complex plane, and its use may be generalized to initial modulation estimates in other quadrants as discussed in further detail below. The number of regions for which the lookup table is constructed may therefore be Q/(4L).

The first (smallest) set of initial candidate points may be generated by using an empty initial set of points:

$S_{r,init} = \phi$. Subsequent, larger sets of initial candidate points, each containing nested within it the next smaller (previously generated) set of initial candidate points may then be generated using the same method, and using the previously generated set of initial candidate points, as an input to the method, for $S_{r,init}$.

The method may consist of the following steps, which may be repeated for each of the Q/(4L) rows of the lookup table, i.e., for each $$r \in \left\{1, 2, \ldots, \frac{Q}{4L}\right\}.$$

In a first step, the set $S_r$ may be initialized to be equal to $S_{r,init}$ (an input to the method). In a second step, the set $S_r$ may be updated to contain all the constellation points of the region corresponding to the lookup table row being generated. For example, if L=1, the set may be initialized with the single point that is in the region. In a third step, $\tilde{x}_r$ may be defined to be the center of the region corresponding to the lookup table row being generated. In a fourth step, the following sub-steps may be performed for each j in the range (0: $\log_2$ Q) (i.e., for each of the bit positions of a binary word corresponding to a constellation point): (i) M points $\acute{x}_{j,0,l} \in Q_{QAM}$, $l \in \{0, \ldots, M-1\}$ may be chosen, closest to $\tilde{x}_r$, such that $b_j = 0$ for each point (where $b_j$ where is the value of the bit at the j-th bit position in the binary word corresponding to the point) (ii) M points $\acute{x}_{j,1,l} \in Q_{QAM}$, $l \in \{0, \ldots, M-1\}$ may be chosen, closest to $\tilde{x}_r$, such that $b_j = 1$ for each point, and (iii) the set $S_r$ may be updated according to $S_r \leftarrow S_r \cup \acute{x}_{j,0,l} \cup \acute{x}_{j,1,l}$. In a fifth step, if $|S_r| > K$, i.e., if the number of points in the set of initial candidate points exceeds K, the process may stop, with the conclusion that a set of initial candidate points of size K does not exist. Otherwise, in a sixth step, if $|S_r| < K$, additional constellation points may be added to $S_r$ while $|S_r| < K$, each additional constellation point being (i) the point closest to $\tilde{x}_r$ that is not already in the set $S_r$, or (ii) if there are several equally close constellation points, a point randomly chosen from among the equally close constellation points. At the completion of the sixth step (or at the completion of the fourth step, if $|S_r| = K$ at the completion of the fourth step), $S_r$ is the set of initial candidate points to be written to the lookup table.

Figure 4:
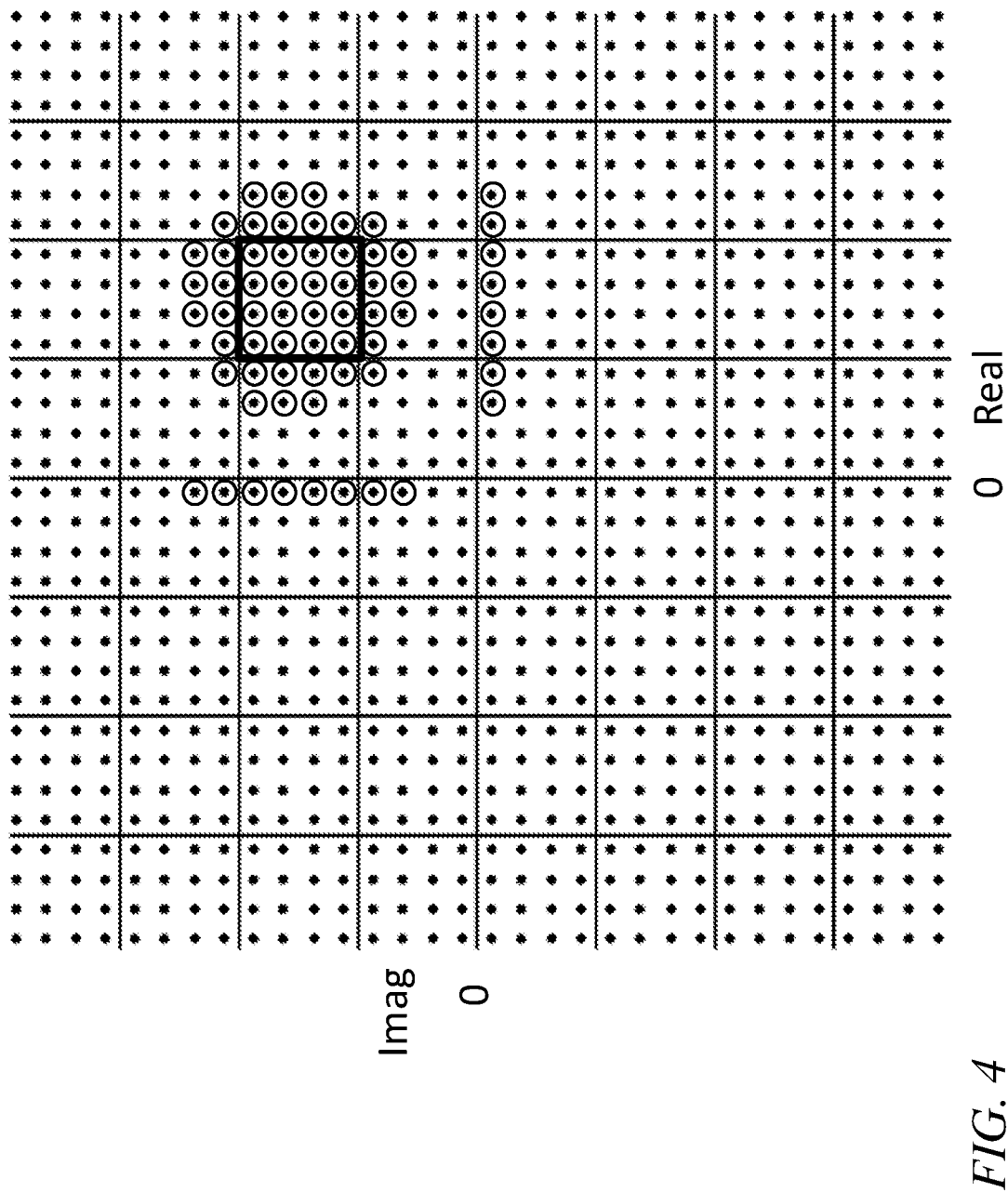
FIG. 4 is a constellation diagram, according to an embodiment of the present disclosure.
Figure 6A:
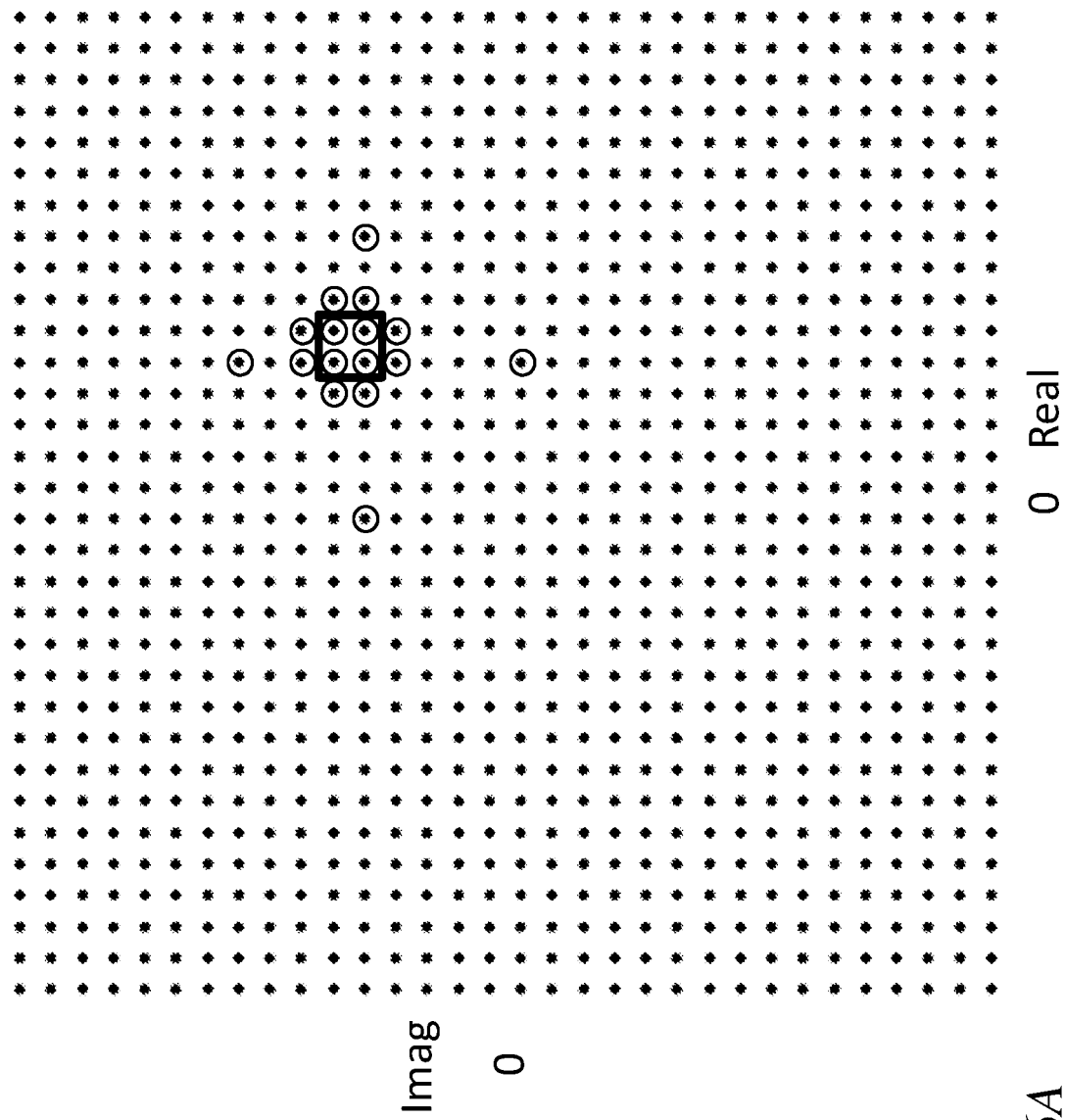
FIG. 6A is a constellation diagram, according to an embodiment of the present disclosure.
Figure 6B:
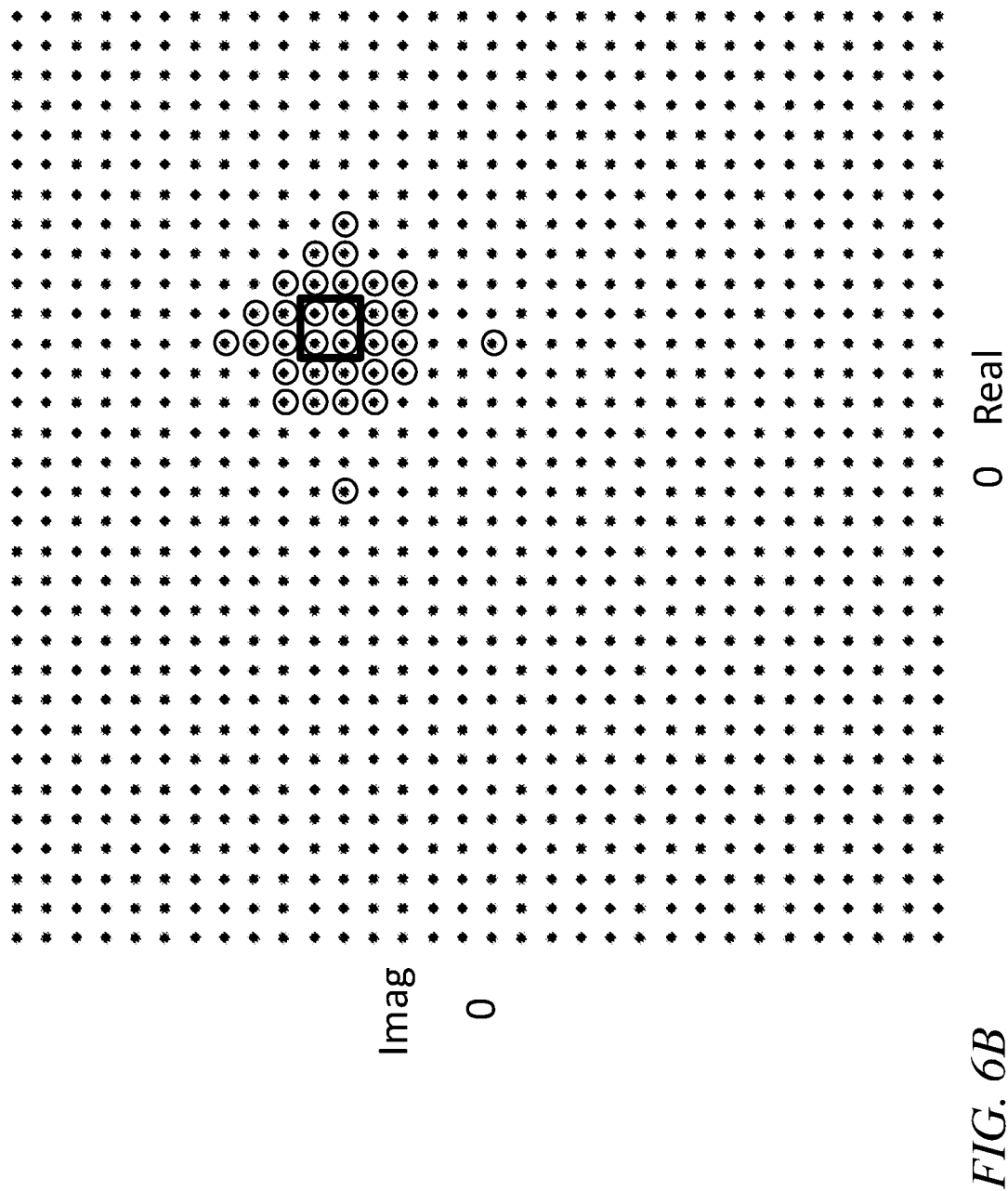
FIG. 6B is a constellation diagram, according to an embodiment of the present disclosure.
Figure 6C:
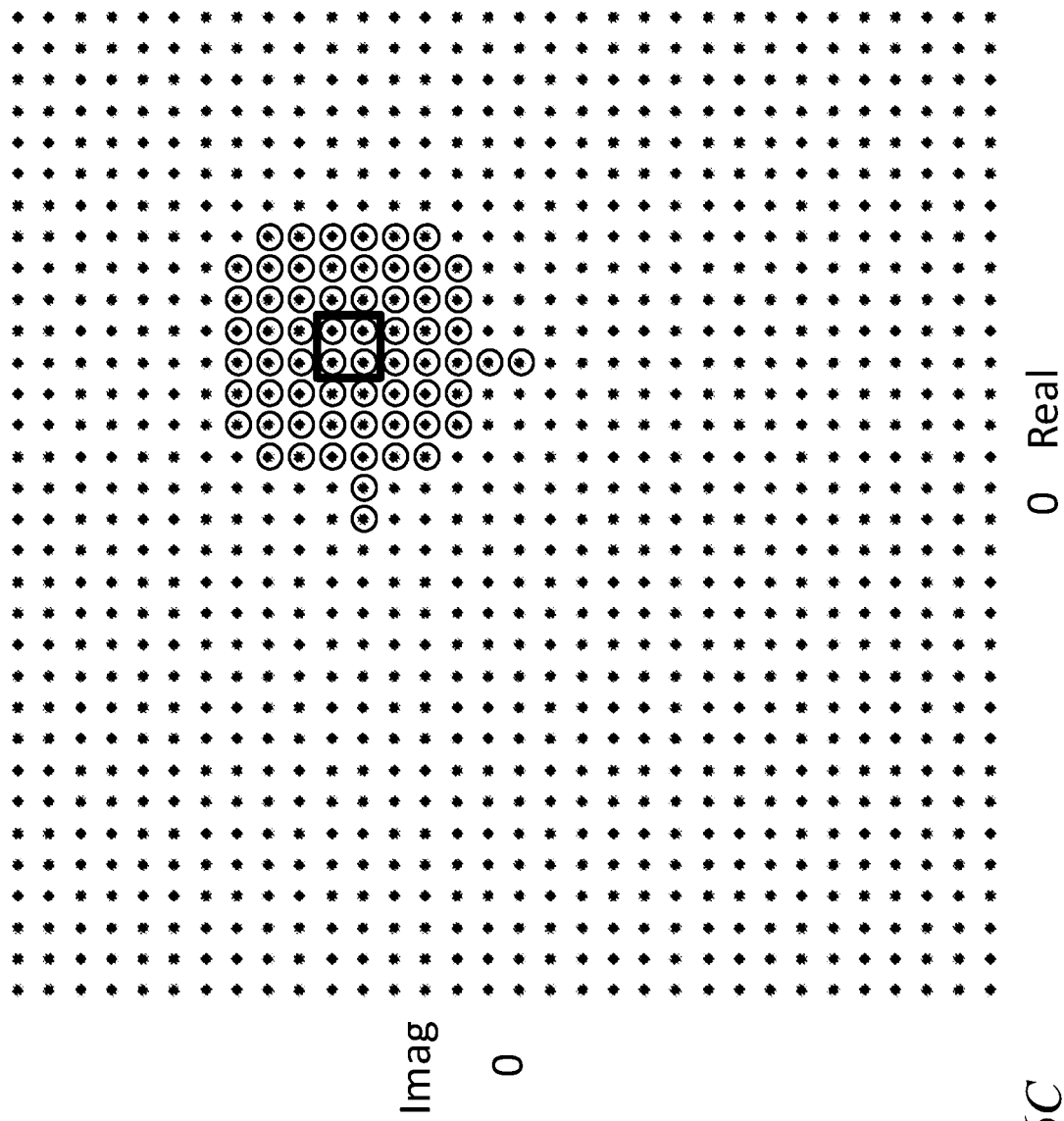
FIG. 6C is a constellation diagram, according to an embodiment of the present disclosure.
Figure 6D:
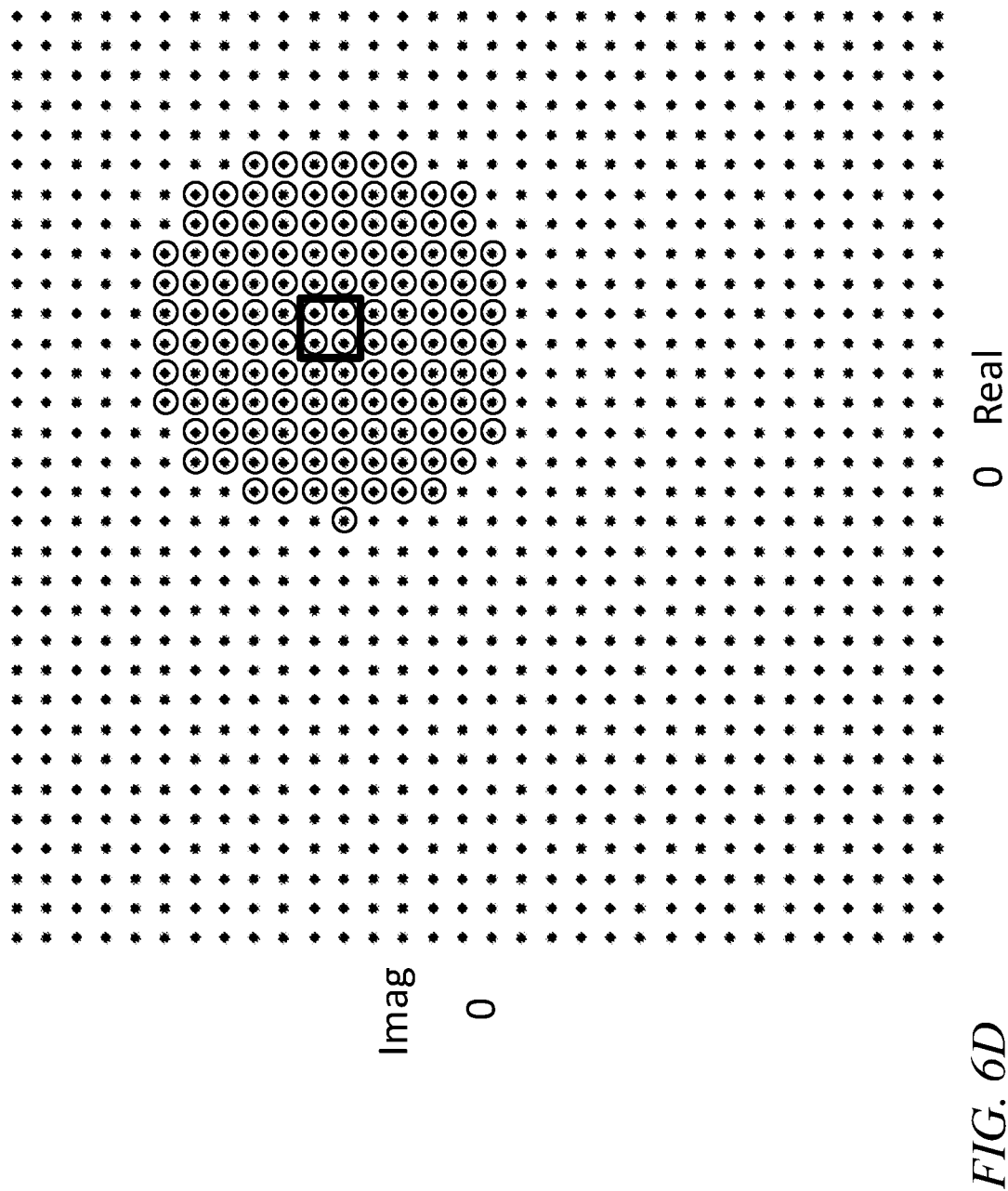
FIG. 6D is a constellation diagram, according to an embodiment of the present disclosure.

FIG. 4 shows a set of 64 initial candidate points that the above-described method may select, for the region outlined in the heavy black line, when a 1024 QAM constellation is divided into 64 regions (with 16 regions per quadrant, i.e., 16 rows per lookup table), with 16 points in each region, and when M=8. It may be seen that the region for which the initial candidate points are generated is in the first quadrant, and the method selects points in the second and fourth quadrant, to obtain points having both binary zero and binary 1 in the two most significant bits. It may also be seen from FIG. 4 that the method may select initial candidate points that are not the closest available points to the center of the region, i.e., that some of the initial candidate points may be more distant from the center of the region than some constellation points that are not initial candidate points.

The table of FIG. 5 shows all of the combinations of values for the parameters K, M, and L that are possible for $K \in \{128, 64, 32, 16\}$ and Q=1024.

FIGS. 6A-6D show the sets of initial candidate points that the above-described method may select, for the region outlined in the heavy black line, when a 1024 QAM constellation is divided into 256 regions with 4 points in each region, and when M=1, and for K=16, 32, 64, and 128 respectively. It may be seen that for each of the cases K=16, 32, and 64, all of the points are present in the set of initial candidate points with the next larger value of K.

As mentioned above, it may be sufficient for the lookup table to list initial candidate points for one quadrant of the complex plane (e.g., the first quadrant). When an initial modulation estimate falls into another quadrant, it may be transformed, using a first transformation, into the quadrant for which the lookup table lists candidate points. This transformation may involve changing the sign of the real part of the initial modulation estimate, or of the imaginary part of the initial modulation estimate, or of both the real part of the initial modulation estimate and the imaginary part of the initial modulation estimate. Once the initial candidate points have been read from the lookup table, they may be transformed back into the quadrant of the initial modulation estimate with a second transformation, corresponding to an inverse of the first transformation. The second transformation may involve, for each of the initial candidate points, reversing, or "flipping", the bit or bits (of the two most significant bits of the binary word corresponding to a constellation point) corresponding to the signs that were changed in the first transformation.

As used herein, any mathematical symbols in italic font has the same meaning as the same symbol in normal font. As used herein, the "distance" between two points refers to the Euclidean distance in the complex plane.

The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed circuit board (PCB) or distributed over several interconnected PCBs. A processing unit may contain other processing units; for example a processing unit may include two processing units, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for initial candidate reduction have been specifically described and illustrated herein, many modifications and variations will be apparent to those skilled in the art. Accordingly, it is to be understood that a system and method for initial candidate reduction constructed according to principles of this disclosure may be embodied other than as specifically described herein.

What is claimed is:

1. A method for receiving a symbol having a length and a corresponding plurality of bit positions, the symbol being associated with a point in a constellation of quadrature amplitude modulation points, each point of the constellation having associated with it a binary word, the method comprising:
   receiving a first analog signal carrying the symbol;
   performing initial estimation based at least in part on the first analog signal, to generate a first initial modulation estimate, for a portion of the first analog signal, the first initial modulation estimate having
      an in-phase component, and
      a quadrature component;
   identifying, based on the first initial modulation estimate, a row of an initial candidate lookup table, the row corresponding to a region of the constellation; and
   reading from the row of the initial candidate lookup table a first plurality of initial candidate points of the constellation, each of the initial candidate points being a point in the constellation, one of the initial candidate points being more distant, from a center of the region, than a point, in the constellation, not among the initial candidate points.

2. The method of claim 1, wherein:
   a respective initial candidate word corresponds to each of the initial candidate points; and at each bit position of the symbol:
   one of the initial candidate words has a one, and
   one of the initial candidate words has a zero.

3. The method of claim 2, wherein at each bit position of the symbol:
   each of two of the initial candidate words has a one, and
   each of two of the initial candidate words has a zero.

4. The method of claim 1, further comprising:
   receiving a second analog signal carrying a modulation;
   performing initial estimation based at least in part on the second analog signal, to generate a second initial modulation estimate, for a portion of the second analog signal, the second initial modulation estimate having
      an in-phase component, and
      a quadrature component;
   identifying, based on the second initial modulation estimate, the row of the initial candidate lookup table; and
   reading from the row of the initial candidate lookup table a second plurality of initial candidate points of the constellation, the second plurality of initial candidate points including the first plurality of initial candidate points, each of the second plurality of initial candidate points being a point in the constellation.

5. The method of claim 4, wherein the initial candidate points of the first plurality of initial candidate points are:
   contiguous within the row of the of the initial candidate lookup table, and
   at one end of the row of the of the initial candidate lookup table.

6. The method of claim 4, wherein:
   a respective initial candidate word corresponds to each of the initial candidate points of the second plurality of initial candidate points; and
   at each bit position of the symbol:
   one of the initial candidate words has a one, and
   one of the initial candidate words has a zero.

7. The method of claim 6, wherein at each bit position of the symbol:
   each of two of the initial candidate words has a one, and
   each of two of the initial candidate words has a zero.

8. The method of claim 1, further comprising:
   determining that the first initial modulation estimate is not in a first quadrant; and in response to determining that the first initial modulation estimate is not in the first quadrant:
    transforming the first initial modulation estimate into the first quadrant using a first transformation; and
    after generating the first plurality of initial candidate points, transforming the initial candidate points with a transformation corresponding to an inverse of the first transformation.

9. The method of claim 8, wherein the transformation corresponding to the inverse of the first transformation comprises reversing one or the other or both of the two most significant bits of the binary word corresponding to a constellation point.

10. The method of claim 1, further comprising calculating a log likelihood ratio for a bit of the symbol over the initial candidate points.

11. The method of claim 10, further comprising calculating the log likelihood ratio as a difference between:
    a first sum of probabilities, over the initial candidate points, and
    a second sum of probabilities, over the initial candidate points.

12. A system for receiving a symbol having a length and a corresponding plurality of bit positions, the symbol being associated with a point in a constellation of quadrature amplitude modulation points, each point of the constellation having associated with it a binary word, the system comprising:
    an analog front end,
    an analog to digital converter, and
    a processing circuit,
    the processing circuit being configured to:
        receive a first analog signal carrying the symbol;
        perform initial estimation based at least in part on the first analog signal, to generate a first initial modulation estimate, for a portion of the first analog signal, the first initial modulation estimate having
            an in-phase component, and
            a quadrature component;
        identify, based on the first initial modulation estimate, a row of an initial candidate lookup table, the row corresponding to a region of the constellation; and
        read from the row of the initial candidate lookup table a first plurality of initial candidate points of the constellation, each of the initial candidate points being a point in the constellation, one of the initial candidate points being more distant, from a center of the region, than a point, in the constellation, not among the initial candidate points.

13. The system of claim 12, wherein:
a respective initial candidate word corresponds to each of the initial candidate points; and at each bit position of the symbol:
one of the initial candidate words has a one, and
one of the initial candidate words has a zero.

14. The system of claim 13, wherein at each bit position of the symbol:
each of two of the initial candidate words has a one, and
each of two of the initial candidate words has a zero.

15. The system of claim 12, wherein the processing circuit is further configured to:
    receive a second analog signal carrying a modulation;
    perform initial estimation based at least in part on the second analog signal, to generate a second initial modulation estimate, for a portion of the second analog signal, the second initial modulation estimate having
        an in-phase component, and
        a quadrature component;
    identify, based on the second initial modulation estimate, the row of the initial candidate lookup table; and
    read from the row of the initial candidate lookup table a second plurality of initial candidate points of the constellation, the second plurality of initial candidate points including the first plurality of initial candidate points, each of the second plurality of initial candidate points being a point in the constellation.

16. The system of claim 15, wherein the initial candidate points of the first plurality of initial candidate points are:
    contiguous within the row of the of the initial candidate lookup table, and
    at one end of the row of the of the initial candidate lookup table.

17. The system of claim 15, wherein:
a respective initial candidate word corresponds to each of the initial candidate points of the second plurality of initial candidate points; and at each bit position of the symbol:
one of the initial candidate words has a one, and
one of the initial candidate words has a zero.

18. The system of claim 17, wherein at each bit position of the symbol:
each of two of the initial candidate words has a one, and
each of two of the initial candidate words has a zero.

19. The system of claim 12, wherein the processing circuit is further configured to:
    determine that the first initial modulation estimate is not in a first quadrant; and
    in response to determining that the first initial modulation estimate is not in the first quadrant:
        transform the first initial modulation estimate into the first quadrant using a first transformation; and
        after generating the first plurality of initial candidate points, transform the initial candidate points with a transformation corresponding to an inverse of the first transformation.

20. A system for receiving a symbol having a length and a corresponding plurality of bit positions, the symbol being associated with a point in a constellation of quadrature amplitude modulation points, each point of the constellation having associated with it a binary word, the system comprising:
    an analog front end,
    an analog to digital converter, and
    a means for processing,
    the means for processing being configured to:
        receive a first analog signal carrying the symbol;
        perform initial estimation based at least in part on the first analog signal, to generate a first initial modulation estimate, for a portion of the first analog signal, the first initial modulation estimate having
            an in-phase component, and
            a quadrature component;
        identify, based on the first initial modulation estimate, a row of an initial candidate lookup table, the row corresponding to a region of the constellation; and
        read from the row of the initial candidate lookup table a first plurality of initial candidate points of the constellation, each of the initial candidate points being a point in the constellation, one of the initial candidate points being more distant, from a center of the region, than a point, in the constellation, not among the initial candidate points.

* * * * *